Jan. 6, 1948.  R. A. FOLSOM  2,434,107
PIPE JOINT
Filed March 29, 1944
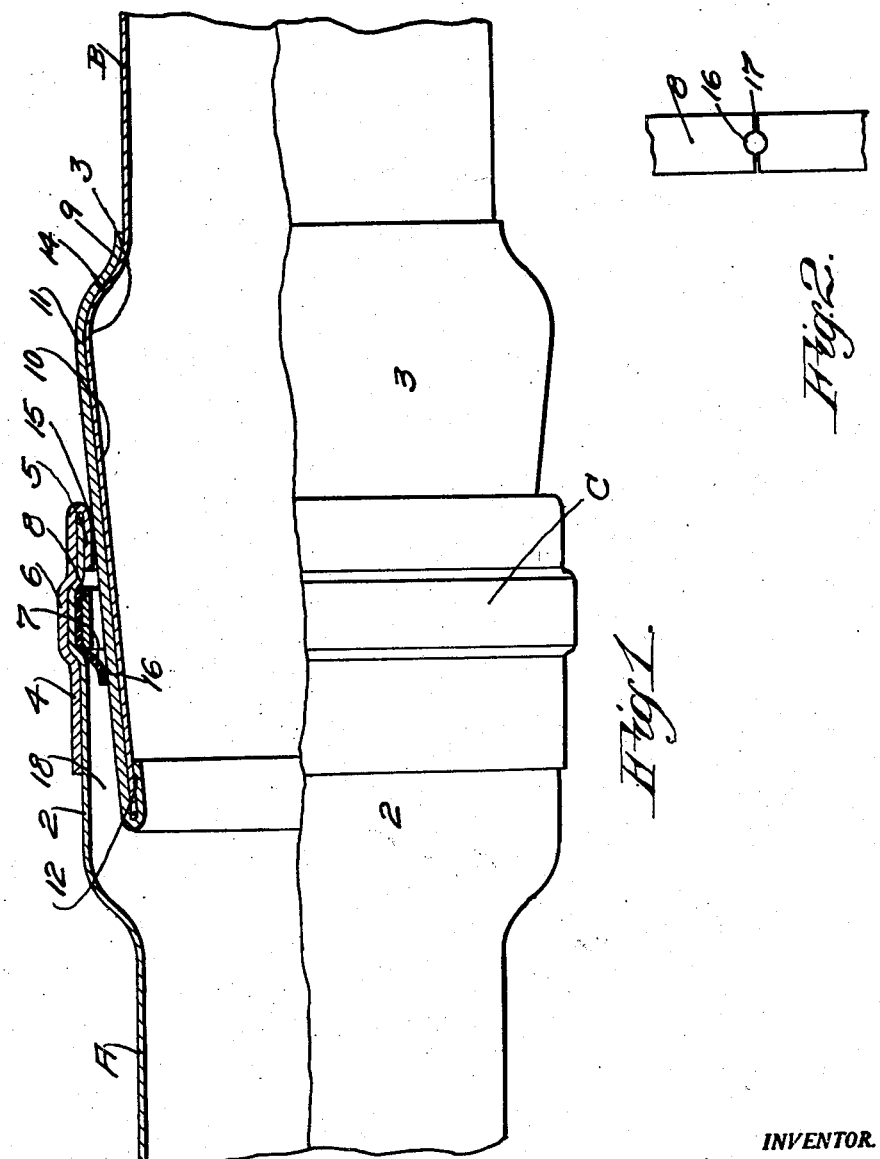
INVENTOR.
ROLFE A. FOLSOM.
BY
Castberg & Boomer
ATTORNEYS.

Patented Jan. 6, 1948

2,434,107

UNITED STATES PATENT OFFICE 2,434,107

PIPE JOINT

Rolfe A. Folsom, Burlingame, Calif.

Application March 29, 1944, Serial No. 528,630

1 Claim. (Cl. 285—163)

This invention relates to portable surface irrigation pipe and especially to a pipe joint whereby pipe sections may be quickly and readily disconnected or joined and frictionally secured when joined.

Surface irrigation pipe is usually made of a fairly light gauge sheet metal and one or both ends should accordingly be reenforced and shaped to form a coupling or joint. The joint provided should be flexible so that the pipe may be laid on uneven ground and a gasket of some character should be employed to prevent leakage.

The object of the present invention is generally to improve and simplify the construction and operation of pipe joints of the character described, to provide a joint which is reenforced, to provide a joint which permits flexibility, to provide a joint which frictionally secures pipe sections against separation, to provide a joint which insures maximum ease of assembly or disassembly, to provide a joint which is simple and cheap to manufacture, to provide a simple form of rubber gasket to prevent leakage, and further to provide a gasket which is readily replaced and secured when inserted in the joint.

The pipe joint and the gasket employed is shown by way of illustration in the accompanying drawings in which—

Fig. 1 is a side elevation of the pipe joint partially in section, and

Fig. 2 is a fragmentary view of a gasket-securing ring.

Referring to the drawings in detail and particularly Fig. 1, A and B indicate the adjacent ends of two pipe sections which in this instance are connected by a pipe joint generally indicated at C, said joint forming the subject matter of the present application.

The joint consists of two sections 2 and 3, the section 2 being commonly termed the female or bell section, and the section 3 the male or spigot. The bell section is formed by expanding the end of pipe A as shown and reenforcing it with an armor section 4, which is turned back upon itself or inwardly, as indicated at 5, to form a rigid annular lip or mouth to receive the spigot 3. Also an annular recess is formed, as indicated at 6, for the reception of a gasket 7 and a retaining or locking ring 8.

The spigot is formed by expanding the pipe B, as indicated at 9, and then tapering it off, as indicated at 10. The spigot is also reenforced by an armor section 11 which is secured by an inturned lip 12 at one end and by spinning or forcing the armor down over the expanded section, as indicated at 14 at the opposite end. The taper indicated at 10 is usually about 8 degrees with relation to the longitudinal axis of the pipe, but it may be more or less, but it cannot be much greater than the angle specified, as a frictional grip is desired between the outer surface of the spigot and the inner surface of the bell at the point indicated at 15. This frictional grip should be sufficient to frictionally secure the pipe sections against accidental release but it should not be so great as to render it difficult to pull apart when the pipes are to be disassembled. Hence, the importance of the angle indicated at 10.

The gasket 7 is of the simplest construction possible as it is cut in the form of rings of suitable width from a rubber tube of proper diameter. This diameter is determined by the diameter of the spigot at the point of contact indicated at 16. The rubber tubing from which the gasket is cut should approximate that diameter and when it is inserted in the bell of the joint about one-half of the gasket is expanded into the recess 6 by the retaining ring, thereby leaving the remaining unexpanded half of the gasket free to engage the exterior surface of the spigot where it will be forced into further engagement by water pressure when the water fills and commences flowing through the pipes.

The ring 8 is an ordinary metal ring split as indicated at 17 in Fig. 2. When this ring is expanded into place, the split ends will meet and the gasket will be expanded and held securely in the recess 6. To permit ready removal of the ring when the gasket needs replacement, notches 18 are formed in the split portion of the ring so that a hook-like implement may be inserted to open or break the split joint of the ring when the old gasket is to be removed.

The pipe joint shown is rigid in construction due to the armoring or reenforcing of both sections of the pipe joint. Both the end of the spigot and the bell are particularly reenforced as the armor metal is turned inwardly, both at the end of the spigot and at the open end of the bell, thus presenting three sections of metal. This is of considerable importance as the ends of the pipe sections might otherwise be nicked or damaged when handling or when being moved from place to place. The joint shown provides all the flexibility necessary for uneven ground or for laying the pipe in a curve, that is the spigot only contacts the bell at the point indicated at 15 and as there is an annular space formed between the bell and the end of the spigot, as indicated at 19, it is obvious that considerable flexibility is provided.

The frictional contact shown at the point 15 due to the taper of the spigot is more than sufficient to secure the pipe sections against accidental release, this being due to proper tapering of the spigot. This frictional connection also provides maximum ease of assembly or disassembly. The rubber gasket employed is of the simplest form possible and so is the retaining ring, the splitting of the retaining ring furthermore permitting quick removal of old gaskets and replacement of new ones whenever necessary. Both the joint itself and the gasket and the ring is of simple construction and cheap to manufacture and all parts are efficient both in construction and in operation.

While this and other features of my invention have been more or less specifically described and illustrated, I nevertheless wish it understood that changes may be resorted to within the scope of the appended claim, and that the materials and finish of the several parts employed may be varied according to the experience of the manufacturer or varying conditions or use may demand.

Having thus described and illustrated my invention, what I claim and wish to secure by Letters Patent is:

A pipe joint for connecting two adjoining pipe sections comprising an expanded section at the end of one pipe forming a bell, an expanded section adjacent the end of the other pipe, said expanded section tapering from a diameter larger than the pipe to a diameter substantially the same as the pipe to form a spigot insertable in the bell, an armor section enclosing and surrounding the bell, said armor having an annular inturned lip to reenforce the mouth of the bell, and an armor section enclosing and surrounding the spigot, said armor having an annular inturned lip to reenforce the end of the spigot.

ROLFE A. FOLSOM.

REFERENCES CITED

The following references are of record in the file of this patent:

UNITED STATES PATENTS

| Number | Name | Date |
| --- | --- | --- |
| 2,244,396 | Kellaher | June 3, 1941 |
| 424,801 | Lessard | Apr. 1, 1890 |
| 1,117,961 | Phillips | Nov. 17, 1914 |
| 1,948,762 | Kirkpatrick | Feb. 27, 1943 |
| 2,314,386 | Brend | Mar. 23, 1943 |
| 1,826,321 | Mitchell | Oct. 6, 1931 |
| 1,743,431 | Congable | Jan. 14, 1930 |
| 2,083,228 | Geyer | June 8, 1937 |